United States Patent
Hsu et al.

(10) Patent No.: US 10,429,972 B2
(45) Date of Patent: Oct. 1, 2019

(54) TOUCH DISPLAY PANEL AND TOUCH DISPLAY APPARATUS THEREOF

(71) Applicant: HON HAI PRECISION INDUSTRY CO., LTD., New Taipei (TW)

(72) Inventors: Yao-Pin Hsu, New Taipei (TW); Yu-Fu Ko, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 169 days.

(21) Appl. No.: 15/606,068

(22) Filed: May 26, 2017

(65) Prior Publication Data

US 2017/0344167 A1 Nov. 30, 2017

(30) Foreign Application Priority Data

May 27, 2016 (TW) .............................. 105116781 A (51) Int. Cl.

| | |
|---|---|
| *G06F 3/041* | (2006.01) |
| *F21V 8/00* | (2006.01) |
| *G02F 1/1333* | (2006.01) |
| *G02F 1/1335* | (2006.01) |
| *G02F 1/1339* | (2006.01) |
| *G02F 1/1343* | (2006.01) |
| *G06F 3/044* | (2006.01) |

(52) U.S. Cl.
CPC ......... *G06F 3/0412* (2013.01); *G02B 6/0053* (2013.01); *G02F 1/13338* (2013.01); *G02F 1/13394* (2013.01); *G02F 1/133514* (2013.01); *G02F 1/134336* (2013.01); *G06F 3/044* (2013.01)

(58) Field of Classification Search
CPC .............. G02B 6/0053; G02F 1/13338; G02F 1/133514; G02F 1/13394; G02F 1/134336; G06F 3/0412; G06F 3/044
See application file for complete search history.

(56) References Cited

U.S. PATENT DOCUMENTS

| | | | | |
|---|---|---|---|---|
| 4,690,511 A | * | 9/1987 | Watanabe ......... | G02F 1/133514 349/106 |
| 4,781,438 A | * | 11/1988 | Noguchi ........... | G02F 1/133514 345/88 |
| 5,365,357 A | * | 11/1994 | Ohgawara ......... | G02F 1/133512 349/106 |

(Continued)

FOREIGN PATENT DOCUMENTS

JP           55041655 A  *  3/1980

*Primary Examiner* — Dmitriy Bolotin
(74) *Attorney, Agent, or Firm* — ScienBiziP, P.C.

(57) ABSTRACT

A touch display apparatus not subject to a moiré pattern appearance includes a substrate, a touch electrode layer, and a color filter layer. The touch electrode layer and the color filter layer are formed on opposite surfaces of the substrate. The touch electrode layer forms a plurality of touch electrodes. Each touch electrode forms a plurality of sub-electrodes. The color filter layer includes a plurality of color filters. A number of the sub-electrodes per unit area is greater than a number of the color filters per unit area. When viewed from directly above, vision color filters otherwise visible to eyes are completely covered and hidden by the sub-electrodes, preventing interference causing moiré phenomenon.

9 Claims, 8 Drawing Sheets

(56) References Cited

U.S. PATENT DOCUMENTS

| | | | | |
|---|---|---|---|---|
| 6,476,890 B1* | 11/2002 | Funahata | ............ | G02F 1/133512 349/110 |
| 8,159,466 B2* | 4/2012 | Ma | ............ | G06F 3/044 345/173 |
| 8,274,493 B2* | 9/2012 | Ma | ............ | G06F 3/044 345/173 |
| 2002/0015121 A1* | 2/2002 | Okumura | ............ | G02F 1/133514 349/106 |
| 2003/0038904 A1* | 2/2003 | Kaneko | ............ | G02F 1/133512 349/110 |
| 2012/0154320 A1* | 6/2012 | Ma | ............ | G06F 3/0412 345/173 |
| 2014/0071557 A1* | 3/2014 | Cain | ............ | G02F 1/1333 359/891 |
| 2015/0002752 A1* | 1/2015 | Shepelev | ............ | G06F 3/044 349/12 |

* cited by examiner

TOUCH DISPLAY PANEL AND TOUCH DISPLAY APPARATUS THEREOF

CROSS-REFERENCE TO RELATED APPLICATIONS

This application claims priority to Taiwanese Patent Application No. 105116781 filed on May 27, 2016, the contents of which are incorporated by reference herein.

FIELD

The subject matter herein generally relates to a touch display apparatus.

BACKGROUND

Figure 5:
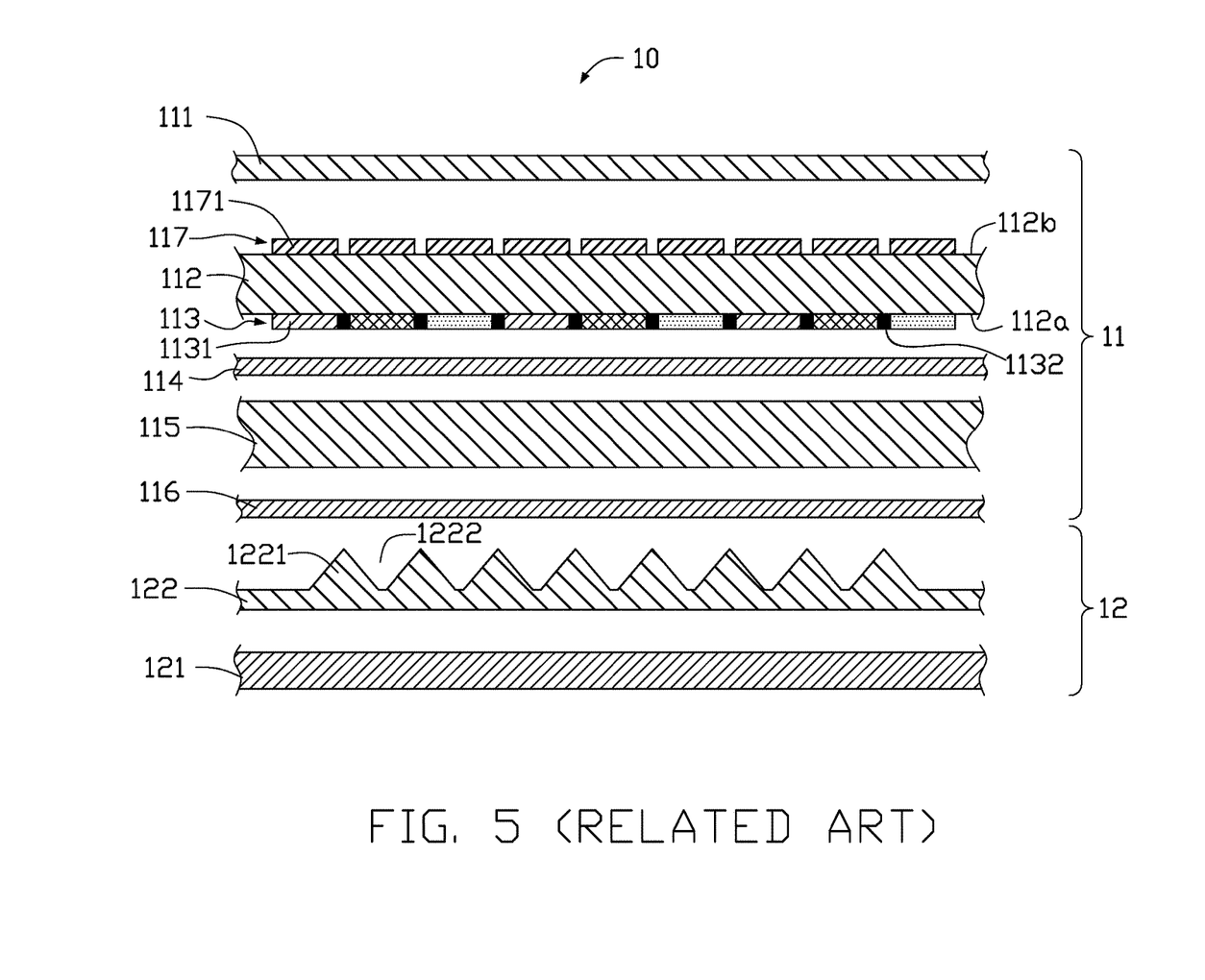
FIG. 5 is a cross-sectional view of a touch display apparatus in related art, the touch display apparatus comprising a touch layer, a color filter layer, and a brightness enhancement film.
Figure 6:
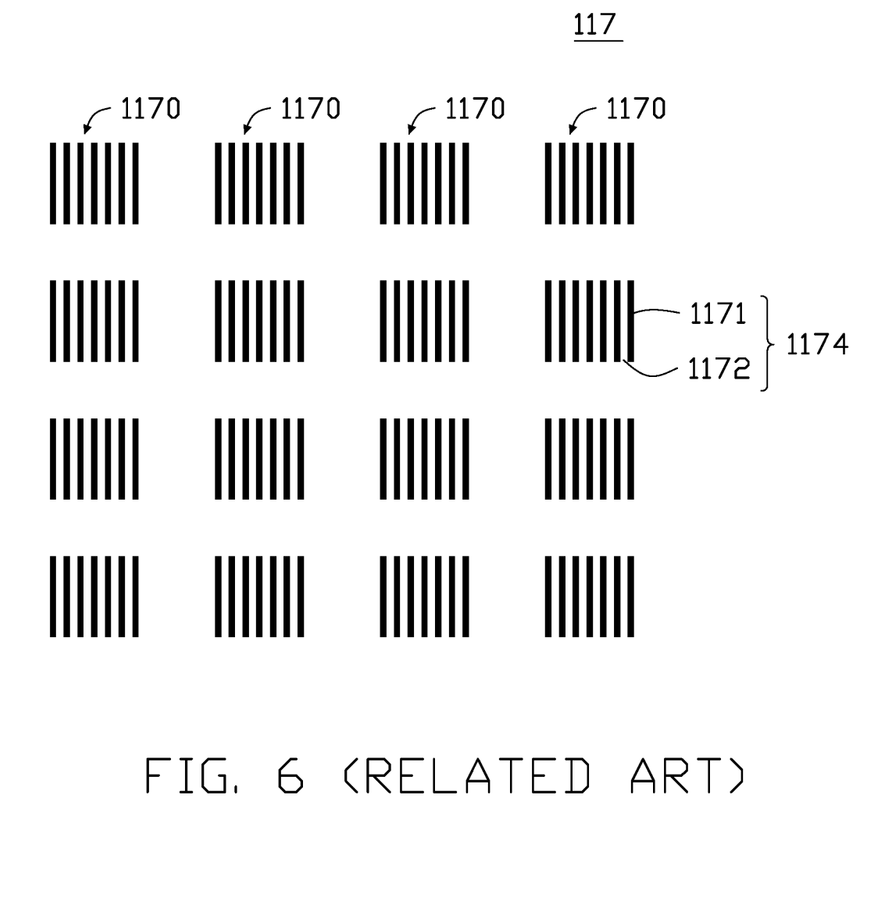
FIG. 6 is a top plan view of an exemplary embodiment of the touch electrode layer with a plurality of touch electrodes of FIG. 5, each touch electrode forms a plurality of sub-electrodes.
Figure 7:
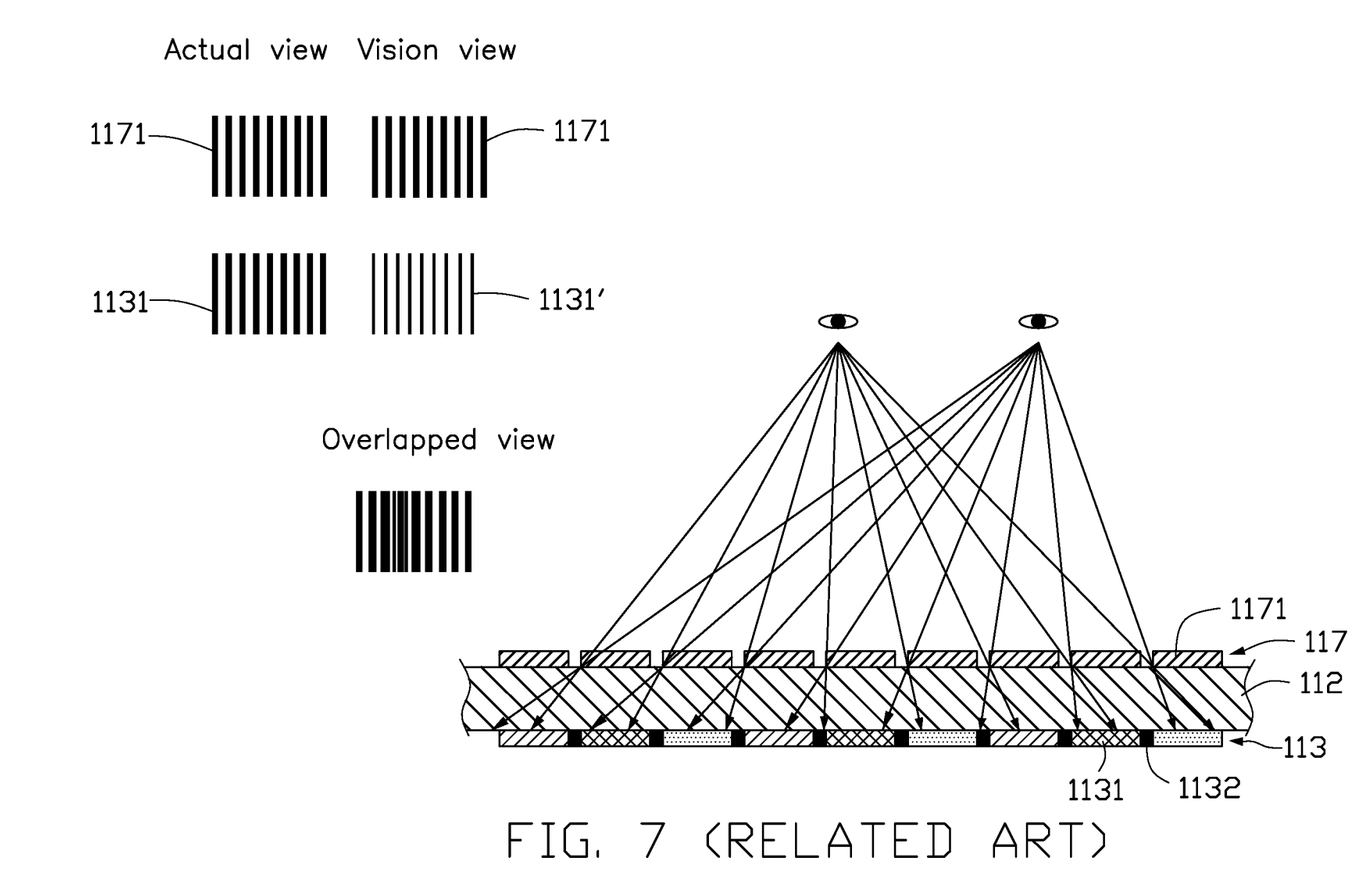
FIG. 7 is a schematic diagram showing an actual view and a visionary view of the sub-electrodes and the color filters of the touch display apparatus of FIG. 5 to generate moiré phenomenon.
Figure 8:
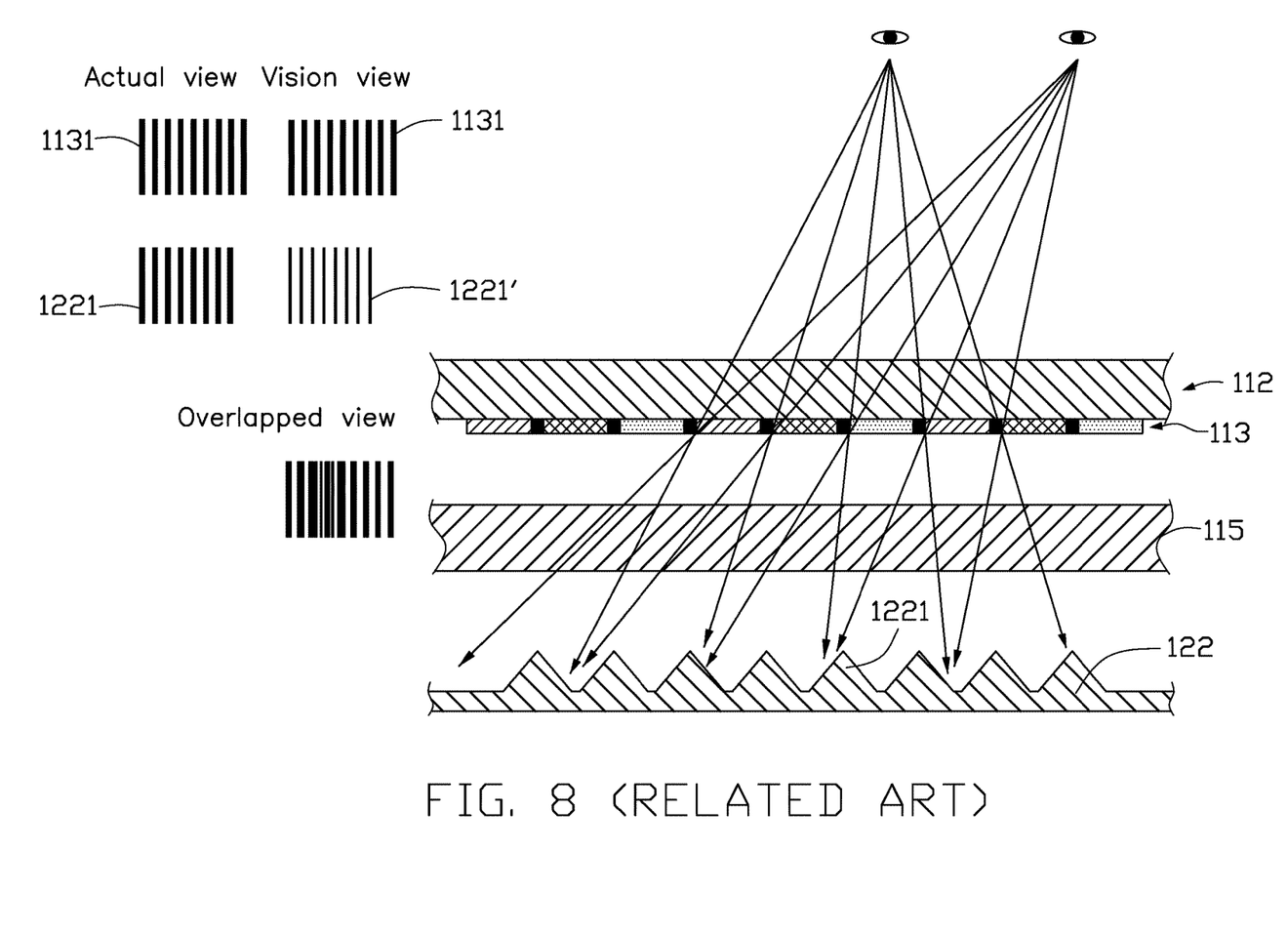
FIG. 8 is a schematic diagram showing an actual view and a visionary view of the color filters and the auxiliary structures of the touch display apparatus of FIG. 1 to generate moiré phenomenon.

As shown in related art in FIGS. 5-8, a touch display apparatus 10 includes a touch display panel 11 and a backlight module 12 below the touch display panel 11. The backlight module 12 provides light to the touch display panel 11. The touch display panel 11 includes a first polarizer 111, a substrate 112, a color filter layer 113, a liquid crystal layer 114, a thin film transistor (TFT) array substrate 115, and a second polarizer 116, which are sequentially arranged. The color filter layer 113 includes a plurality of color filters 1131 spaced from each other and a plurality of black spacers 1132. Each black spacer 1132 is disposed between two adjacent color filters 1131. The touch display panel 11 further includes a touch electrode layer 117 having a plurality of touch electrodes 1170 (as shown in FIG. 6) arranged in a matrix. Each touch electrode 1170 includes a plurality of sub-electrodes 1171, for example in a pattern. Only the sub-electrodes 1171 in one touch electrode 1170 is shown in FIG. 5. A space 1172 is formed between two adjacent sub-electrodes 1171. Each sub-electrode 1171 faces one of the color filters 1131. A width of one of the sub-electrodes 1171 along a specified direction parallel with the surface of the color filter layer 113 equals a width of the corresponding color filter 1131 along the specified direction. The backlight module 12 includes a light source 121 and a brightness enhancement film (BEF) 122. The BEF 122 concentrates light emitted by the light source 121 toward the touch display panel 11 for improving the brightness of the touch display panel 11. The BEF 122 includes a plurality of auxiliary structures 1221 spaced from each other. The auxiliary structures 1221 protrude from a surface of the BEF 122 facing the touch display panel 11. A cross-section of the auxiliary structures 1221 is substantially triangular. A maximum width of each of the auxiliary structures 1221 along the specified direction equals a width of one of the color filters 1131 along the specified direction. When viewed along a direction perpendicular to the touch display apparatus 10, because of refraction of light, projections of the color filters 1131 and the auxiliary structures 1221 fill the spaces 1172 and, with the sub-electrodes 1171, form visible dark lines, and thus a moiré phenomenon is created. FIG. 7 and FIG. 8 show this phenomenon. A better structure of the touch display apparatus is needed for preventing the moiré pattern and acquiring a better display effect.

BRIEF DESCRIPTION OF THE FIGURES

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

As discussed above, when a user is directly facing a conventional touch display structure, a moiré pattern may be visible based on color filters or auxiliary structures of a BEF filling the space between two adjacent sub-electrodes, the sub-electrodes forming visible dark lines. Exemplary embodiments of the present application relate to a touch display apparatus that substantially eliminates the appearance of a moiré pattern. According to exemplary embodiments of the present application, a width of each color filter is greater than a width of each sub-electrode, and a width of each auxiliary structure is greater than a width of each color filter. Projections of color filters and the auxiliary structures captured by eyes of a viewer are completely covered by the projections of sub-electrodes.

Figure 1:
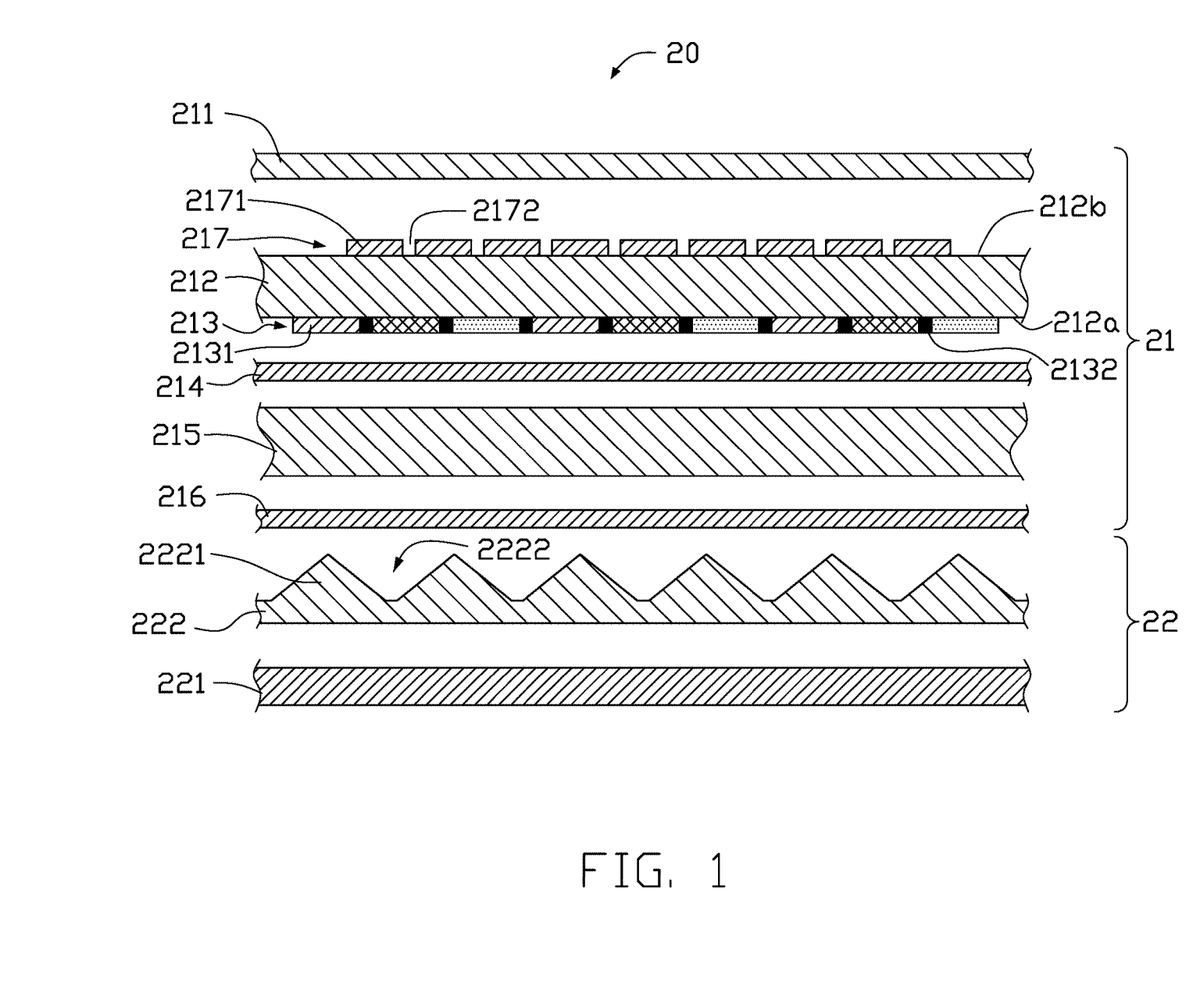
FIG. 1 is a cross-sectional view of an exemplary embodiment of a touch display apparatus with a touch electrode layer, a color filter layer, and a brightness enhancement film with a plurality of auxiliary structures.

FIG. 1 illustrates an exemplary embodiment of a touch display apparatus 20. The touch display apparatus 20 may be, for example, a liquid crystal display (LCD) panel having a touch function. In this exemplary embodiment, the touch display apparatus 20 is an in-cell touch display apparatus. In other exemplary embodiments, the touch display apparatus 20 may be an on-cell touch display apparatus.

The touch display apparatus 20 includes a touch display panel 21 and a backlight module 22 located below the touch display panel 21. The backlight module 22 provides light to the touch display panel 21.

Figure 3:
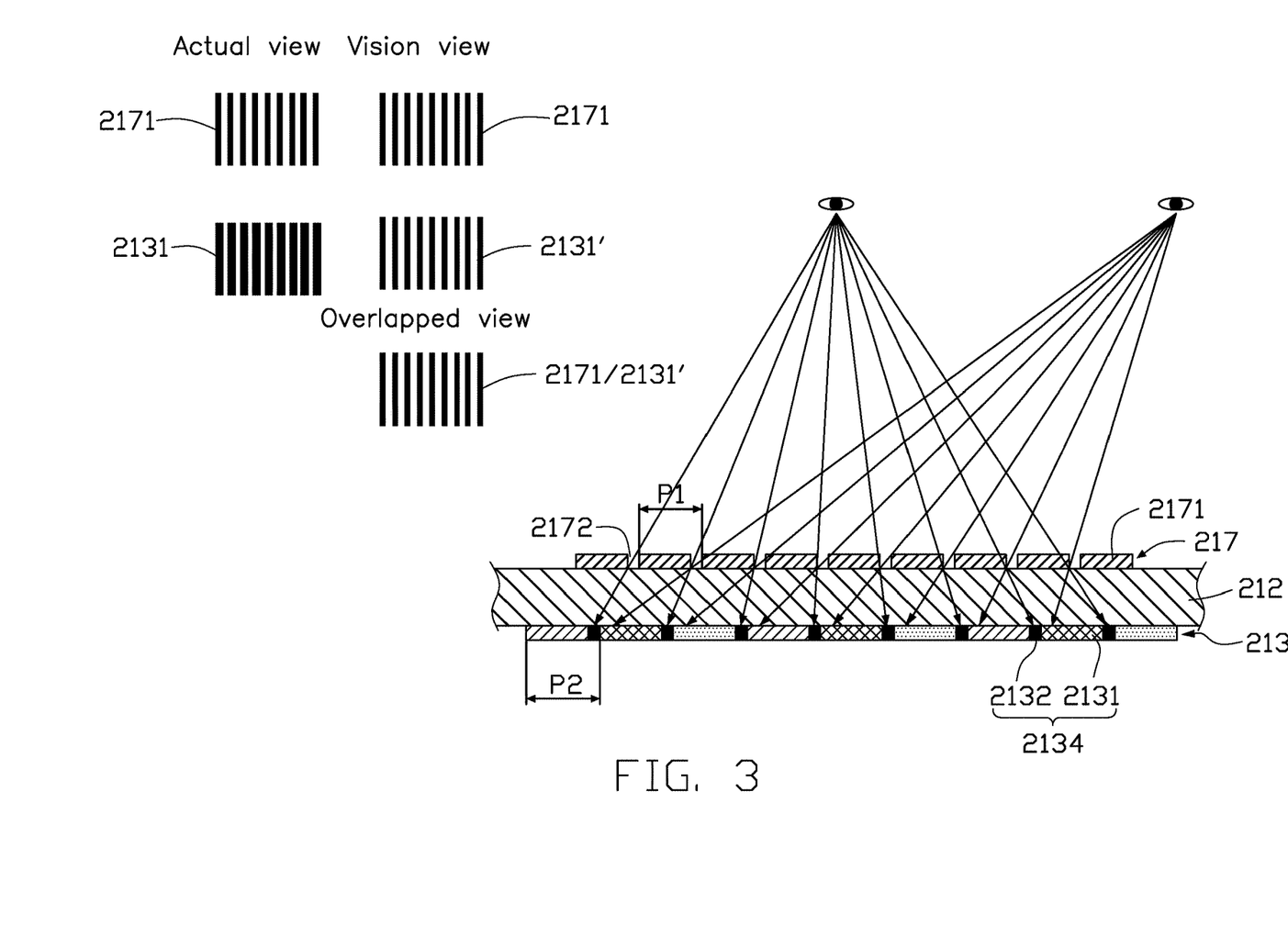
FIG. 3 is a schematic diagram showing an actual view and a visionary view of the sub-electrodes and the color filters of the touch display apparatus of FIG. 1 arranged to eliminate the moiré phenomenon.

The touch display panel 21 includes a first polarizer 211, a substrate 212, a color filter layer 213, a liquid crystal layer 214, a thin film transistor (TFT) array substrate 215, and a second polarizer 216, which are sequentially arranged. The substrate 212 includes a first surface 212a facing the crystal layer 214, and a second surface 212b opposite to the first surface 212a. The color filter layer 213 is formed on the first surface 212a and includes a plurality of color filters 2131 and a plurality of black spacers 2132. Each black spacer 2132 is positioned between two adjacent color filters 2131. Each color filter 2131 cooperates with one of the black spacers 2132 to form a color filter pitch 2134 (as shown in FIG. 3). A cross-section of each color filter 2131 is substantially rectangular. All the color filters 2131 have substantially the same shape. In at least one exemplary embodiment, the color filters 2131 may include green color filters, red color filters, and blue color filters, where lights emitted by two adjacent color filters are different.

Figure 2:
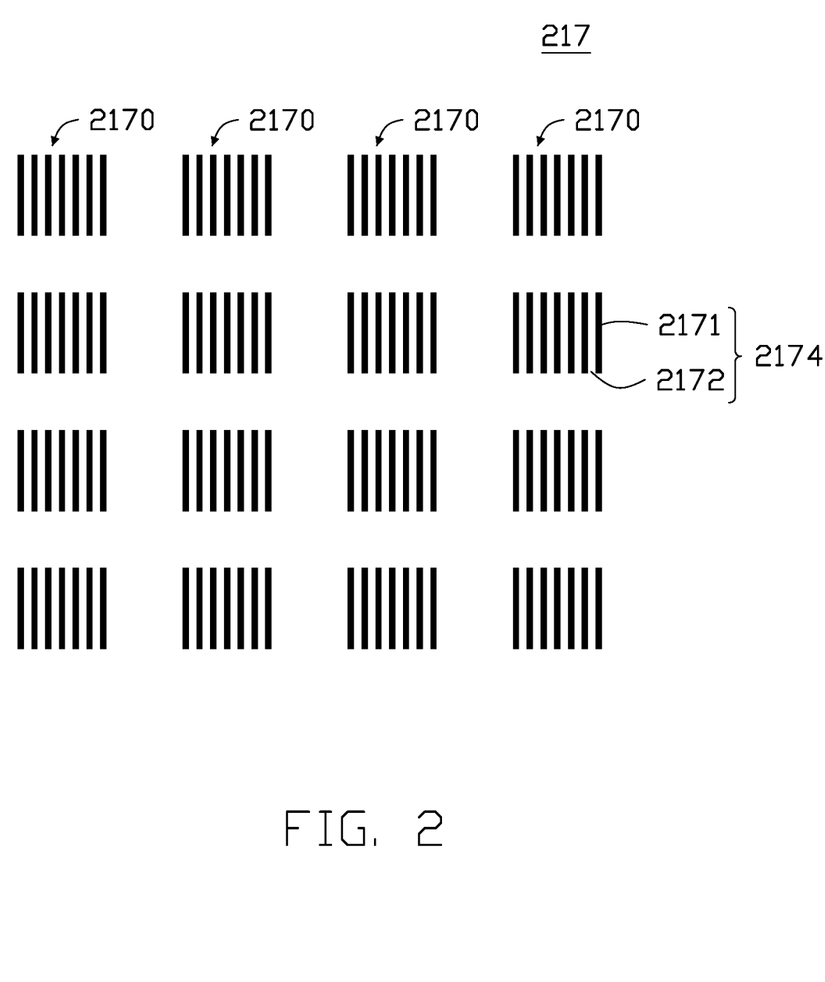
FIG. 2 is a top plan view of an exemplary embodiment of the touch electrode layer with a plurality of touch electrodes of FIG. 1, each touch electrode forms a plurality of sub-electrodes.

FIG. 2 is top plan view of an exemplary embodiment of the touch electrode layer with a plurality of touch electrodes of FIG. 1, each touch electrode having a plurality of sub-electrodes. For example, FIG. 2 illustrates a touch electrode layer 217 of the touch display panel 21. The touch electrode layer 217 is formed on the second surface 212b of the substrate 212 (as shown in FIG. 1). The touch electrode layer 217 includes a plurality of touch electrodes 2170 arranged in a matrix. Each touch electrode 2170 includes a plurality of sub-electrodes 2171 parallel with each other, for example in a pattern. The sub-electrodes 2171 shown in FIG. 1 are consisted in one touch electrode 2170. The sub-electrodes 2171 extend along a first direction parallel with the first surface 212a. A spacer 2172 is positioned between two adjacent sub-electrodes 2171. Each sub-electrode 2171 cooperates with one of the spacers 2172 to form a touch pitch 2174. The sub-electrodes 2171 are substantially rectangular. As shown in FIG. 3, under the "Actual view", the number of the sub-electrodes 2171 per unit area of the touch electrode layer 217 is greater than the number of the color filters 2131 per unit area. In other words, the area occupied by the fine color filters 2131 is greater than the area occupied by the fine sub-electrodes 2171. A width P1 of the touch pitch 2174 along a second direction perpendicular to the first direction is less than a width P2 of the color filter pitch 2134 along the second direction. In one exemplary embodiment, the width P2 is an integer multiple of the width P1. As shown in the FIG. 3, under the "Vision view", the sub-electrodes 2171 completely cover vision color filters 2131' due to refraction of light passing through the substrate 212. In at least one exemplary embodiment, as in the "Vision view" shown in the top left corner of FIG. 3, a vision width of the vision color filter 2131' equals the width P1 of the sub-electrode 2171, and the number of the sub-electrodes 2171 per unit area equals a vision number of the vision color filters 2131' per unit area. Thus, under the vision view, the color filters 2131' are completely overlapped by the corresponding sub-electrodes 2171 (an overlapped "Vision view" is shown in the top left corner of FIG. 3 as an "Overlapped view"). The vision color filters 2131' become be invisible to the eyes of the viewer, thus there is no interference causing a visual phenomenon between the sub-electrodes 2171 and the vision color filters 2131'. It is noted that the "Actual view" shows the actual physical shapes of the electrodes and the color filters. The "Vision view" shows the effective visualized shapes of the electrodes and the color filters perceived by the eyes of the viewer, taking into account of the viewing position and light refraction.

In at least one exemplary embodiment, the touch electrode layer 217 is attached to the second surface 212b by an adhesive, such as an optically clear adhesive (OCA). In at least one exemplary embodiment, the sub-electrodes 2171 can be indium tin oxide (ITO) electrode or silver nano electrode. In other exemplary embodiments, parts of the sub-electrodes 2171 are arranged along the first direction, and others sub-electrodes 2171 are arranged along the second direction parallel with the first surface 212a.

Figure 4:
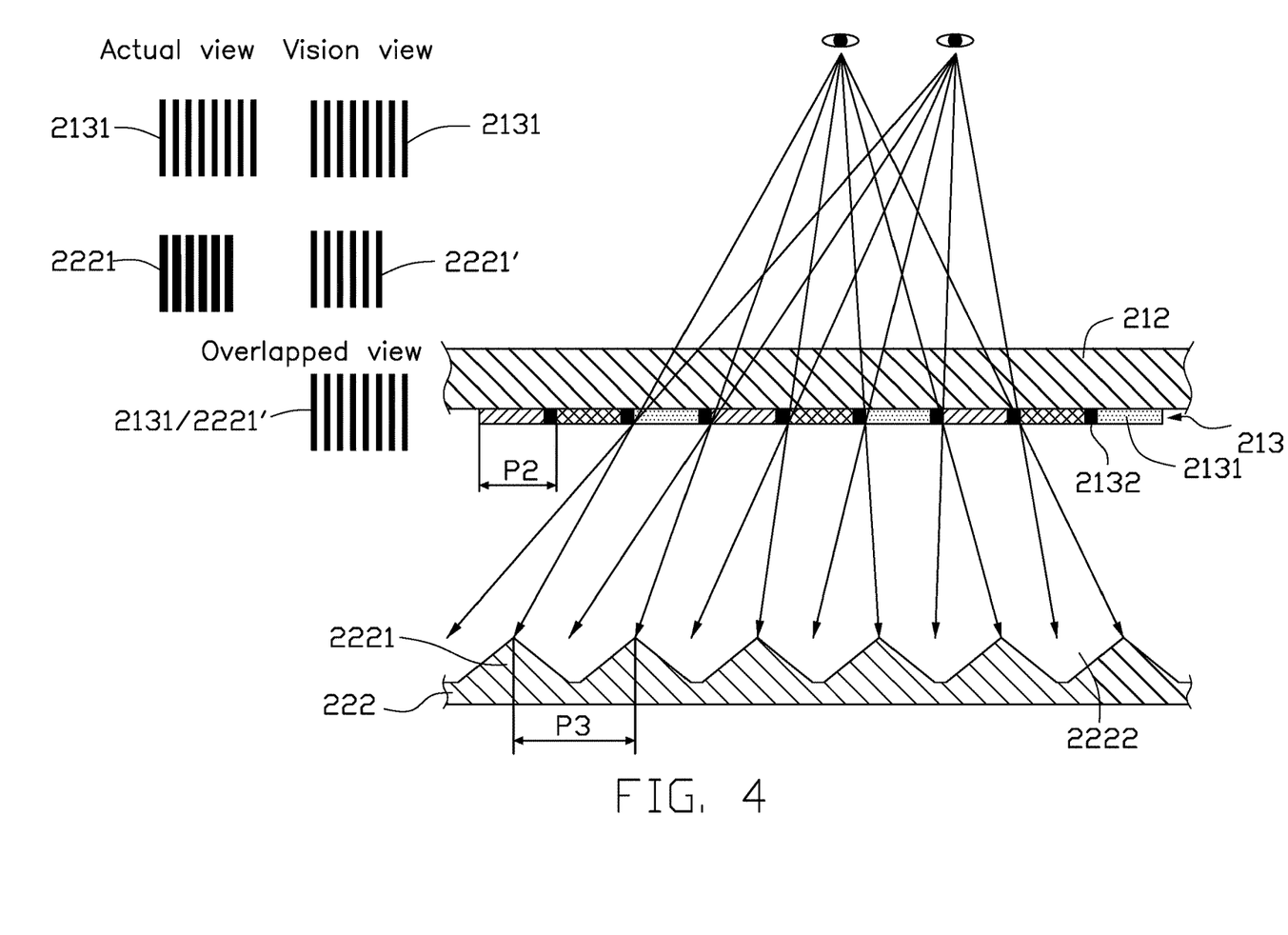
FIG. 4 is a schematic diagram showing an actual view and a visionary view of the color filters and the auxiliary structures of the touch display apparatus of FIG. 1 to eliminate the moiré phenomenon.

The backlight module 22 includes a light source 221 and a brightness enhancement film (BEF) 222. The BEF 222 is located between the second polarizer 216 and the light source 221, and concentrates light emitted by the light source 221 toward the touch display panel 21, for improving a brightness of the touch display panel 21. The BEF 222 includes a plurality of auxiliary structures 2221. The auxiliary structures 2221 are spaced from each other by a second specified distance. The auxiliary structures 2221 extend from a surface of the BEF 222 facing the color filter layer 213 toward the color filter layer 213. A cross-section of the auxiliary structure 2221 is triangular. As seen in the "Actual view" in the top left corner in FIG. 4, the number of the auxiliary structures 2221 per unit area is less than the number of the color filters 2131 per unit area. In other words, the density of the auxiliary structures 2221 per unit area is less than the density of the color filters 2131. A maximum distance P3 between the peaks of two adjacent auxiliary structures 2221 along the second direction is greater than the width P2 of the color filter pitch 2134 along the second direction. In one exemplary embodiment, the maximum width P3 is an integer multiple of the width P2. As shown in the "Vision view", the color filters 2131 completely cover the vision auxiliary structures 2221', such that the vision auxiliary structures 2221' are invisible to the eyes of the viewer, due to refraction of light passing through the substrate 212. In at least one exemplary embodiment, under the "Vision view" shown in the top left corner of FIG. 4, a vision width of each of the vision auxiliary structures 2221' equals the width P1 of the color filters 2131, and a vision number of the vision auxiliary structures 2221' per unit area equals the number of the color filters 2131 per unit area. Thus, under the "Vision view", the vision auxiliary structures 2221' are completely overlapped by the corresponding color filters 2131. An overlapped "Vision view" is shown in FIG. 4 as the "Overlapped view". Thus, there is no interference causing visual phenomenon between the vision auxiliary structure 2221' and the color filters 2131. In at least one exemplary embodiment, the backlight module 22 can further include a back plate (not shown), a reflector (not shown), a diffusion layer (not shown), and a guiding plate (not shown).

In at least one exemplary embodiment, the BEF 222 can be made of polyethylene terephthalate (PET). It is noted that the "Actual view" shows the actual physical shapes of the electrodes and the color filters. The "Vision view" shows the effective visualized shapes of the electrodes and the color filters perceived by the eyes of the viewer, taking into account of the viewing position and light refraction.

Based on the structure of touch display apparatus 20, the width of sub-electrodes of the touch electrodes, the color filters, and the auxiliary structures are gradually increased, thus the moiré phenomenon is reduced and/or substantially prevented, and a display effect of touch display apparatus 20 is improved.

While various exemplary and preferred exemplary embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A touch display apparatus comprising:
   a substrate with a first surface and a second surface, the second surface opposite to the first surface;
   a touch electrode layer formed on the first surface, the touch electrode layer having a plurality of touch electrodes arranged in a matrix; and
   a color filter layer formed on the second surface, the color filter layer having a plurality of color filters;
   wherein each of the plurality of touch electrodes comprises a plurality of sub-electrodes parallel with each other along a first direction; a number of the sub-electrodes per unit area is greater than a number of the plurality of color filters per unit area; when viewed along a direction perpendicular to the touch display apparatus, vision color filters captured by eyes of a view are completely covered by the plurality of sub-electrodes based on a refraction of light passing through the substrate.

2. The touch display apparatus of claim 1, wherein a vision number of the vision color filters per unit area equals the number of the plurality of sub-electrodes per unit area.

3. The touch display apparatus of claim 1, wherein a spacer is disposed between two adjacent sub-electrodes; each of the plurality of sub-electrodes cooperates with one of the spacer to form a touch pitch; a black spacer is disposed between two adjacent color filters; each of the plurality of color filters cooperates with the black spacer to form a color filter pitch; a width of the touch pitch along a second direction perpendicular to the first direction is less than a width of the color filter pitch along the second direction; the width of the color filter pitch is an integer multiple of the width of the touch pitch.

4. The touch display apparatus of claim 3, wherein the width of the sub-electrode equals a vision width of the vision color filter.

5. The touch display apparatus of claim 4, wherein a vision number of the vision auxiliary structures equals the number of the color filters per unit area.

6. A touch display panel comprising:
   a substrate with a first surface and a second surface opposite to the first surface;
   a touch electrode layer formed on the first surface; the touch electrode layer having a plurality of touch electrodes arranged in a matrix; and
   a color filter layer formed on the second surface; the color filter layer having a plurality of color filters;
   wherein each of the plurality of the touch electrodes forms a plurality of sub-electrodes parallel with each other along a first direction; a number of the sub-electrodes per unit area is greater than a number of the color filters per unit area; in a direction perpendicular to the touch display apparatus, vision color filters captured by eyes are completely covered by the sub-electrodes based on a refraction of light passing through the substrate.

7. The touch display panel of claim 6, wherein a vision number of the vision color filters per unit area equals the number of the sub-electrodes per unit area.

8. The touch display panel of claim 6, wherein a spacer is disposed between two adjacent sub-electrodes; each of the plurality of the sub-electrodes cooperates with one of the spacer to form a touch pitch; a black spacer is disposed between two adjacent color filters; each of the plurality of color filters cooperates with a black spacer to form a color filter pitch; a width of the touch pitch along a second direction perpendicular to the first direction is less than a width of the color filter pitch along the second direction; the width of the color filter pitch is an integer multiple of the width of the touch pitch.

9. The touch display panel of claim 8, wherein the width of the sub-electrode equals a vision width of the vision color filter.

* * * * *